Patented Dec. 27, 1949

2,492,453

UNITED STATES PATENT OFFICE 2,492,453

STABILIZATION OF FORMALDEHYDE

Edward S. Yates, Fultonville, N. Y., assignor to E. I. du Pont de Nemours & Company, Wilmington, Del., a corporation of Delaware No Drawing. Application November 19, 1947, Serial No. 787,021

2 Claims. (Cl. 260—606)

This invention relates to the stabilization of formaldehyde against acid formation and, more particularly, it relates to the treatment of an aqueous solution of formaldehyde to reduce oxidation to formic acid.

Aqueous solutions of formaldehyde, particularly such solutions containing between 30% and 95% formaldehyde, gradually lose strength and increase in acidity during storage. The mechanism of such acid formation is not entirely understood, but is probably due in large part to the cannizzaro reaction, i. e., the auto-oxidation reaction of formaldehyde with itself and water to form, by oxidation, formic acid and to form, by reduction, methanol. The formaldehyde is also subject to oxidation to formic acid by oxygen present in the solution.

The above-mentioned reactions which gradually take place in formaldehyde solutions are probably enhanced and catalyzed by the presence of iron and aluminum, which metals are contained in aqueous solutions of formaldehyde as a result of contact with iron and aluminum apparatus used in the manufacture thereof, or minute amounts of such metals may be contained in the water used in the production of the formaldehyde solution.

Acid formation is usually inappreciable for ordinary storage periods at room temperature, but increases rapidly with increase in temperature. This makes acid formation particularly troublesome for solutions of 37% to 60% concentration which contain little or no methanol and must be kept at elevated temperatures to prevent precipitation of polymer. Methanol acts as a stabilizer against polymer precipitation.

The quantity of formic acid in aqueous formaldehyde is very small, even when such solutions have been subjected to extended periods of storage. The utility of formaldehyde for certain uses is, however, dependent upon maintaining the formic acid content exceedingly low, for example, less than 0.05%. The stabilization of formaldehyde against formic acid formation has been troublesome and constitutes a problem which has been of considerable concern for years.

In my copending application Serial No. 687,614, filed August 1, 1946, now matured to Patent No. 2,488,363, issued November 15, 1949, I have described and claimed an invention relating to the stabilization of aqueous solutions of formaldehyde against acid formation by the addition thereto of phosphoric acid or water-soluble phosphates, preferably in combination with an amine of the group consisting of primary aliphatic amines and hydroxy alkyl amines containing not to exceed four carbon atoms and hexamethylene tetramine.

The presence in aqueous solutions of formaldehyde of a compound containing phosphorus is undesirable for some uses of such formaldehyde solutions. For example, when used in the preparation of formaldehyde-containing resins, the presence of phosphorus-containing compounds is objectionable.

It is an object of this invention to produce aqueous solutions of formaldehyde containing a substance or substances that will increase the stability of said solutions against acid formation.

It is another object of this invention to produce aqueous solutions of formaldehyde containing a substance or substances that will increase the stability of said solutions against acid formation, the presence of which substance or substances will not be objectionable when the formaldehyde solutions are used in the production of formaldehyde-containing resins.

Other objects of the invention will appear hereinafter.

The objects of the invention may be accomplished, in general, by adding to an aqueous solution of formaldehyde, containing between 30% and 95% by weight of formaldehyde, a compound taken from the group consisting of aliphatic hydroxy, aliphatic amino and aliphatic hydroxy amino acids containing not to exceed ten carbon atoms and alkali metal salts of such aliphatic acids, together with hexamethylene tetramine.

As above indicated, the invention is particularly applicable to aqueous formaldehyde solutions containing between 30% and 95% by weight of formaldehyde. Formaldehyde solutions of less than 30% strength usually do not have an objectionable acidity and need not be stored at elevated temperatures.

The aliphatic hydroxy, amino, or hydroxy amino acid, or alkali metal salt thereof, is preferably added in very small amount to avoid undue adulteration. The desired effect of retarding formic acid formation in the formaldehyde will be accomplished by the addition of 0.001% to 0.1% of said acid or salt by weight of the formaldehyde solution, with an optimal concentration of the order of 0.002% to 0.004%. Larger amounts than 0.1% can, however, be used, particularly where adulteration is of little or no consequence.

As examples of aliphatic hydroxy, amino, and hydroxy amino acids having not to exceed ten carbon atoms and alkali metal salts thereof, the following may be named: glycolic acid, citric acid, tartaric acid, lactic acid, hydracrylic acid, maleic acid, hydroxy butyric acid; glycine, beta-alanine, cysteine, amino succinic acid, glutamic acid, lysine, nitrogen triacetic acid, ethylene diamine tetra-acetic acid; serine hydroxy glutamic acid and alpha-amino beta-hydroxy butyric acid; and alkali metal salts of the above-named acids.

The hexamethylene tetramine (hexamine) is also preferably added in very small amounts, for example between 0.005% and 0.05%, based on the weight of the formaldehyde solution, with a preferred concentration of 0.01% to 0.02%. Again, where adulteration is of very little significance, hexamine can be added in much larger amounts. The hexamine need not be added as such, but may be formed, in situ, in the formaldehyde solution, for example, by the addition of ammonia or ammonium hydroxide to the formaldehyde. The ammonia will react with formaldehyde to form the hexamine. The term "hexamine" or its equivalent "hexamethylenetetramine," as used throughout the specification and claims, is meant to include the presence of this substance whether added as such or formed, in situ, in the solution.

Hexamine has a useful neutralizing effect on formic acid which is of value apart from its stabilizing action, and accounts for decreases in acidity of formaldehyde solutions on storage. The hexamine also appears to form a complex with the iron or aluminum which may be present as impurity in the formaldehyde solution.

The hydroxy, amino, or hydroxy amino acids, or alkali metal salts thereof, together with the hexamine may be added to the formaldehyde solution as it is produced, to the materials from which it is produced, or after its production is complete. Preferably, these materials are added to the scrubber water used in absorbing the formaldehyde during the production thereof.

The hydroxy, amino, or hydroxy amino acids or alkali metal salts thereof appear to function synergistically with the hexamine to stabilize formaldehyde solutions against formic acid formation therein since the stabilizing effect of the acids or acid salts in the presence of hexamine is greater than the additive stabilizing effects of the substances taken individually.

The following tabulated examples are given to illustrate certain preferred stabilized formaldehyde solutions containing added stabilizers in accordance with the present invention, it being understood that the invention is not to be limited to the details set forth therein.

A freshly prepared aqueous solution of formaldehyde containing about 50% by weight of formaldehyde was divided into samples of substantially equal volume and the percentage by weight of formic acid therein determined. To different samples were added different amounts of hydroxy, amino, or hydroxy amino acids or alkali metal salts thereof with or without hexamine, as set forth in the following table. To other control samples nothing was added. All samples were allowed to stand for six weeks at 65° C. after which the percentage content of formic acid was again determined. The results obtained were as follows:

Table

| Stabilizers | | Per Cent Acid | | |
|---|---|---|---|---|
| Percent Conc. | Name | Start | 6 Weeks | Diff. |
| CONTROL TESTS | | | | |
| None | | 0.037 | 0.092 | 0.055 |
| None | | 0.030 | 0.071 | 0.041 |
| None | | 0.028 | 0.082 | 0.054 |
| None | | 0.035 | 0.067 | 0.052 |
| None | | 0.019 | 0.110 | 0.091 |
| None | | 0.037 | 0.088 | 0.051 |
| HEXAMINE | | | | |
| 0.015 | Hexamine | 0.036 | 0.075 | 0.029 |
| 0.020 | do | 0.035 | 0.064 | 0.029 |
| 0.020 | do | 0.031 | 0.052 | 0.021 |
| 0.020 | do | 0.034 | 0.044 | 0.010 |
| 0.020 | Hexamine (formed in situ by addition of NH₃) | 0.028 | 0.045 | 0.017 |
| 0.025 | Hexamine | 0.036 | 0.060 | 0.024 |
| 0.025 | do | 0.027 | 0.045 | 0.018 |
| AMINO ACIDS, HYDROXY ACIDS, AND HYDROXY AMINO ACIDS | | | | |
| 0.002 | Ethylenediamine tetra-acetic acid | 0.036 | 0.101 | 0.065 |
| 0.002 | Glycine | 0.034 | 0.105 | 0.071 |
| 0.004 | Lysine | 0.034 | ¹0.071 | ¹0.037 |
| 0.002 | Glutamic acid | 0.028 | 0.089 | 0.061 |
| 0.002 | Cysteine | 0.029 | 0.116 | 0.087 |
| 0.002 | beta-Alanine | 0.028 | 0.082 | 0.054 |
| 0.002 | Serine | 0.033 | 0.092 | 0.059 |
| 0.004 | Sodium citrate | 0.028 | 0.057 | 0.029 |
| 0.002 | Glycolic acid | 0.037 | 0.089 | 0.052 |
| 0.002 | Diglycolic acid | 0.039 | 0.088 | 0.049 |
| HEXAMINE AND MISC. HYDROXY AND AMINO ACIDS | | | | |
| 0.020 / 0.002 | Hexamine / Ethylenediamine tetra-acetic acid | 0.035 | 0.019 | −0.016 |
| 0.020 / 0.002 | Hexamine / Glycollic Acid | 0.035 | 0.034 | −0.001 |
| 0.020 / 0.004 | Hexamine / Sodium Citrate | 0.034 | 0.031 | −0.003 |
| 0.002 | Glycine | | | |
| 0.015 / 0.004 | Hexamine / Lysine | 0.032 | 0.050 | 0.018 |
| 0.015 / 0.002 | Hexamine / Serine | 0.034 | 0.057 | 0.023 |
| 0.015 / 0.002 | Hexamine / Glutamic Acid | 0.034 | 0.027 | −0.007 |
| 0.015 / 0.002 | Hexamine / Cysteine | 0.031 | 0.042 | 0.011 |
| 0.015 / 0.002 | Hexamine / beta-Alanine | 0.028 | 0.043 | 0.015 |
| 0.015 | Hexamine | 0.028 | 0.040 | 0.012 |

¹ Two weeks.

Reference in the specification and claims to parts, proportions and percentages, unless otherwise specified, refers to parts, proportions and percentages by weight.

Since it is obvious that many changes and modifications can be made in the above-described details without departing from the nature and spirit of the invention, it is to be understood that the invention is not to be limited to said details except as set forth in the appended claims.

What is claimed is:

1. The process of stabilizing an aqueous solution of formaldehyde containing between 30% and 95% by weight of formaldehyde which comprises adding to said solution between 0.001% and 0.1% by weight of a compound taken from the group consisting of aliphatic hydroxy, amino and hydroxy amino acids containing not to exceed ten carbon atoms and alkali metal salts of such aliphatic acids, together with between 0.005% and 0.05% by weight of hexamethylenetetramine.

2. An aqueous solution of formaldehyde containing between 30% and 95% by weight of formaldehyde stabilized by the addition thereto of between 0.001% and 0.1% by weight of a compound taken from the group consisting of aliphatic hydroxy, amino and hydroxy amino acids containing not to exceed ten carbon atoms and alkali metal salts of such aliphatic acids, together with between 0.005% and 0.05% by weight of hexamethylenetetramine.

EDWARD S. YATES.

REFERENCES CITED

The following references are of record in the file of this patent:

UNITED STATES PATENTS

| Number | Name | Date |
|---|---|---|
| 2,267,290 | Somerville et al. | Dec. 23, 1941 |